United States Patent [19]
Kikuchi

[11] 4,287,245
[45] Sep. 1, 1981

[54] HEAT INSULATOR FOR PIPE LINES

[75] Inventor: Siro Kikuchi, Yokohama, Japan

[73] Assignee: Nippon Asbestos Co., Ltd., Tokyo, Japan

[21] Appl. No.: 34,620

[22] Filed: Apr. 30, 1979

[30] Foreign Application Priority Data

Apr. 28, 1978 [JP] Japan .................. 53/58272[U]
May 8, 1978 [JP] Japan .................. 53/61275[U]
May 30, 1978 [JP] Japan .................. 53/73121[U]

[51] Int. Cl.³ .............. B32B 3/30; F16L 57/00; F16L 59/02

[52] U.S. Cl. .................. 428/36; 138/141; 138/145; 138/149; 138/DIG. 9; 428/60; 428/310; 428/313; 428/315

[58] Field of Search .......... 428/36, 222, 315, 310, 428/313, 57–61; 138/141, 149, DIG. 2, DIG. 9, 143, 144, 150, 151, 155, DIG. 10; 220/902

[56] References Cited

U.S. PATENT DOCUMENTS

| | | | |
|---|---|---|---|
| 3,415,288 | 12/1968 | Marshack | 138/141 |
| 3,437,551 | 4/1969 | Marshack | 428/315 |
| 3,614,967 | 10/1971 | Royston | 428/36 |
| 3,618,754 | 11/1971 | Hoey | 428/231 |
| 3,665,968 | 5/1972 | De Putter | 138/149 |
| 3,693,665 | 9/1972 | Veerling et al. | 138/149 |
| 3,807,458 | 4/1974 | Royston | 138/141 |
| 3,814,659 | 6/1974 | Nadeau | 138/DIG. 9 |
| 3,830,899 | 8/1974 | Piccioli et al. | 138/141 |
| 3,847,693 | 11/1974 | Ghersa et al. | 138/149 |
| 3,927,233 | 12/1975 | Naidoff | 428/58 |
| 3,931,908 | 1/1976 | Cheyney | 220/902 |
| 3,954,926 | 5/1976 | Phal et al. | 428/315 |
| 4,087,501 | 5/1978 | Moser | 428/36 |
| 4,103,320 | 7/1978 | de Putter | 138/149 |
| 4,128,187 | 12/1978 | Okamoto et al. | 220/901 |

Primary Examiner—William J. Van Balen
Attorney, Agent, or Firm—Becker & Becker, Inc.

[57] ABSTRACT

A heat insulator for pipe lines for transportation of low temperature fluids which includes a plurality of longitudinally divided hollow cylindrical heat-insulating units assembled to tightly cover the outer periphery of the pipe lines, characterized in that each heat-insulating unit is composed of a heat-insulating panel element of a circular arc in cross section made of a foamed synthetic resin overlaid and integrally combined with an elastic sheet capable of absorbing stress caused by shrinkage of the heat-insulating panel element at low temperature and a thin metal plate placed on the outer surface of the elastic sheet and integrally combined therewith and that a sealing means is applied to the longitudinal and transverse joint contact surfaces of the adjacent heat-insulating units. This heat insulator can easily be fabricated, conveyed to the place where pipe lines to be protected are installed, and assembled in situ at a reduced cost and are effectively prevented from delamination of the metal plate by virtue of the elastic sheet interposed between the heat-insulating panel element and the thin metal plate.

29 Claims, 11 Drawing Figures

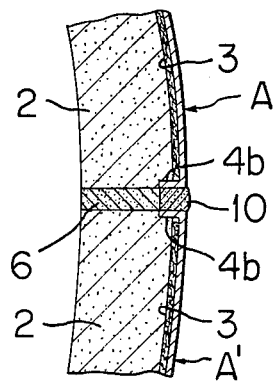
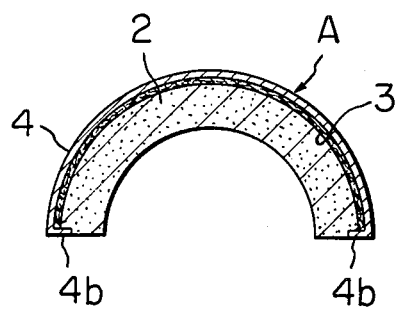
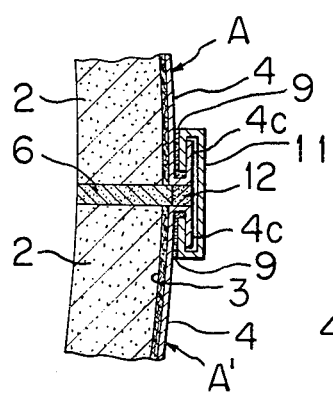
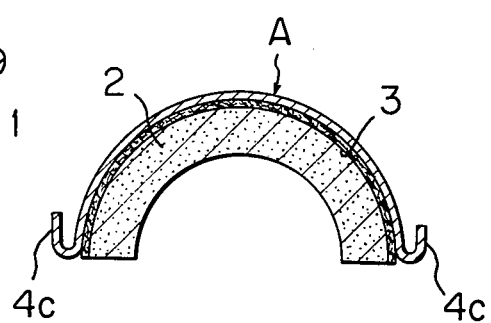

HEAT INSULATOR FOR PIPE LINES

BACKGROUND OF THE INVENTION

This invention relates to a heat insulator for pipe lines for transportation of low temperature fluids such as LPG, LEG, LNG and the like liquefied gases. More particularly, this invention relates to an improvement in a heat insulator for pipe lines for transportation of low temperature fluids, and comprises a plurality of longitudinally divided hollow cylindrical heat-insulating units each composed of a heat-insulating panel element of a circular arc in cross section made of a foamed synthetic resin and a metal protective cover (a metal jacket) overlaying the outer surface of the element and integrally combined therewith.

In past conventional heat insulation systems for pipe lines of this type, rigid polyurethane foam shaped into a circular arc panel was widely used as a heat-insulating unit. Because of its excellent workability and heat-insulating property, a heat insulator made of rigid polyurethane foam was considered to be suitable for the purpose of heat-insulating pipe lines for transporting a supercooled fluid kept at a temperature as low as $-100°\sim-200°$ C.

A practical method for constructing such heat insulation system comprises assembling a plurality of the heat-insulating panel elements with a circular arc cross section to form cylindrical heat-insulating elements arranged in series on the outer periphery of a pipe within which a supercooled fluid is conveyed, applying, if necessary, a joint sealer to the joint contact surfaces of the adjacent elements, fixing the assembled heat-insulating elements around the pipe by a proper fixing means such as an adhesive, an adhesive tape, wires, or steel bands, applying a layer of a water- and moisture-proof material such as mastic or a water-repellent sheet onto the surface of the heat-insulating elements, and winding a thin metal plate such as a zinc- or resin-coated iron plate on the layer for ensuring sheathing and moisture-proof purposes.

However, the heat-insulating system of this type is disadvantageous in that it requires hard labor and incurs considerable costs and time for construction works. In order to overcome such defects, an attempt was made to simplify the construction works for the heat-insulating system by previously binding a thin metal plate onto the outer surface of the heat-insulating panel element of a circular arc in cross section made of a foamed synthetic resin with the aid of an adhesive or by utilizing self-adhesiveness of the foamed synthetic resin. A thin metal plate exhibits very excellent performance as a moisture-proof and sheathing material in the heat-insulating system, but the metal is significantly different in expansion coefficient from the foamed synthetic resin. Such difference permits partial delamination of the thin metal plate from the heat-insulating element made of the foamed synthetic resin, thus forming wrinkles on the metal plate due to the stress caused by shrinkage of the foamed synthetic resin at a low temperature during the operation of transporting a supercooled fluid through the pipe line. In case such wrinkles are formed in the joint contact surfaces (referred to hereinafter simply as the joint portion) between the adjacent cylindrical heat insulating units, moisture and water will enter through the wrinkled joint portions to deteriorate the heat-insulating property and, in the extreme case, breakage of the insulator will occur by increase in volume of the entered water by freezing, thus resulting in such disadvantage that the function as heat-insulating system be seriously damaged to incur a considerable loss.

Since the foamed synthetic resin is greater in the degree of shrinkage at a low temperature than the transportation pipe, interstices or voids will be formed in the joint portion between the adjacent heat-insulating units, especially in case of pipe lines being kept at an extremely low temperature, whereby permeation of moisture and water as well as thermal short circuit will occur in the damaged joint portions, and what is more, breakage or rupture of the insulator itself will take place on freezing of the permeated water.

Proposed to overcome such drawbacks is a method wherein a refractory coating material, such as foamed glass, heat-shielding material made of calcium silicate or pearlite or asbestos plate, previously processed to have a given shape is mounted to the outside of a foamed synthetic resin insulating element at the same time or after application of the foamed synthetic resin insulating material and finally a thin metal plate as the outermost jacket is applied for the purpose of protecting the refractory material and adding beautiful appearance (Japanese Patent Publn. No. 17871/68 and Japanese U.M. Publn. No. 4386/71). However, this method still involves such drawbacks that many troublesome steps are needed for previously shaping the refractory coating material and conveying the shaped article to the place where a heat insulator for pipe lines is constructed and that since such refractory material is brittle, loss of the material caused by mechanical damage during the transportation and construction of insulator is not negligible and incurs high costs. Thus, an improved refractory coating material is proposed to overcome such drawbacks wherein the previously shaped pearlite refractory material is bound with a double adhesive tape (Japanese U.M. Publn. No. 10391/71). However, this refractory coating material also involves such technical and economical disadvantages that it is practically impossible to bind the pearlite refractory material and the foamed synthetic resin insulating material with an adhesive tape so as to exert a binding strength strong enough for handling, that even if both materials are bound temporarily, both materials will be separated while being conveyed or used for construction of the insulator, and that further application of a moisture-preventing material and a top-covering material is needed.

In the field of heat insulators for pipe lines, therefore, there is a great demand for developing a heat insulator not only improved in moisture-proof and heat-insulating properties but also prevented from delamination due to shrinkage of the foamed synthetic resin at low temperatures.

BRIEF SUMMARY OF THE INVENTION

Accordingly, it is an object of the present invention to provide a heat insulator which is devoid of the problems involved in the prior art heat insulation system.

It is another object of the present invention to provide a heat insulator for pipe lines for transportation of extremely low temperature fluids which is reinforced in joint portions of a plurality of heat-insulating units to enhance the sealing function of the joint portions and is effectively prevented from delamination of a thin sheathing metal plate from the synthetic resin insulating element caused by shrinkage of the synthetic resin at an extremely low temperature.

It is still another object of the present invention to provide a heat insulator for pipe lines for transportation of extremely low temperature fluids which is simple in structure and is easily fabricated, conveyed to the place where pipe lines to be protected are installed, and assembled in situ at a reduced cost.

Other and further objects, features and advantages of the present invention will become obvious more fully on understanding of the illustrative embodiments about to be described.

BRIEF DESCRIPTION OF THE DRAWINGS

FIG. 8 is a cross-section view of still another example of the semicylindrical heat insulating unit.

FIG. 9 is a partially enlarged cross-section view of a joint portion of the heat insulating unit shown in FIG. 8.

FIG. 10 is a cross-section view of further example of the semi-cylindrical heat insulating unit.

FIG. 11 is a partially enlarged cross-section view of a joint portion of the heat insulating unit shown in FIG. 10.

DETAILED DESCRIPTION OF THE INVENTION

In accordance with this invention, there is provided a heat insulator for pipe lines for transportation of low temperature fluids which comprises a plurality of longitudinally divided hollow cylindrical heat-insulating units assembled to tightly cover the outer periphery of the pipe lines, characterized in that each heat-insulating units is composed of a heat-insulating panel element of a circular arc in cross section made of a foamed synthetic resin overlaid and integrally combined with an elastic sheet capable of absorbing stress caused by shrinkage of the heat-insulating panel element at a low temperature and a thin metal plate placed on the outer surface of the elastic sheet and integrally combined therewith and that a sealing means is applied to the longitudinal and transverse joint contact surfaces of the adjacent heat-insulating units.

The present invention will now be explained in detail with reference to the accompanying drawings.

Figure 1:
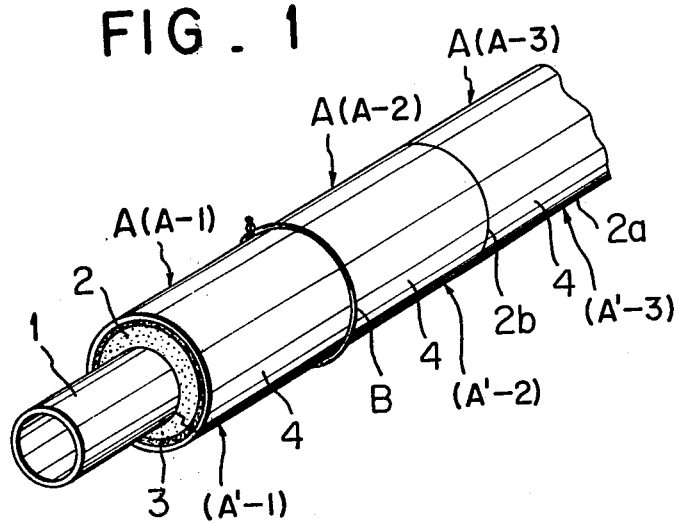
FIG. 1 is a perspective view of one embodiment of the heat insulator of this invention.

In FIG. 1, a pipe 1 for transportation of an extremely low temperature fluid is provided with the heat insulator of this invention composed of a plurality of longitudinally divided cylindrical heat-insulating units A (A-1, A-2, A-3, etc.) arranged in series to cover the pipe 1 over its full length. Since each heat-insulating unit A is circular arc in cross section, two or more units (e.g. A, A') are first combined in the transverse direction to the pipe line to form a complete hollow cylindrical heat-insulating unit as a minimum unit for constructing a series of the heat-insulating units arranged to cover the whole outer periphery of the pipe 1 over its full length. Each heat-insulating unit is preferably semi-cylindrical in shape so that a pair of them (A-1 and A'-1, A-2 and A'-2; etc.) is used as a minimum unit for the construction of the heat insulator of this invention.

The heat-insulating unit may be originally in a hollow cylindrical form through which the pipe 1 is inserted. However, the heat-insulating unit of this type is extremely inconvenient in practical use because the pipe lines should be covered originally with the heat-insulating units of this type prior to the installation of the pipe lines. In case the heat insulator is composed of a plurality of longitudinally divided hollow cylindrical heat-insulating units, there can be expected such a technical merit that the insulator can readily be assembled at any time and at need to cover the pipe lines after they have been installed. Thus, the heat insulator of the present invention are in principle composed of a series of the longitudinally divided hollow heat-insulating units.

A fastening means B is used to secure complete fixing of the heat insulator to the pipe 1. However, the use of such fastening means B may be omitted if an adhesive used for binding the adjacent heat-insulating units is strong enough in adhesiveness. Any of the conventional fastening means such as a rope, wire, belt, tape or chain furnished with a mechanical fastening member can be used as the fastening means B.

The length and thickness of the heat insulator depend on the diameter and length of the pipe line to be protected and on the temperature of the fluid passed therethrough. Usually, the length of the heat insulator can be adjusted by increasing or decreasing the number of the heat-insulating units arranged in series. In general, the use of the heat-insulating unit having a thickness of 20~300 mm and a length of 0.1~10 m is preferable. When the pipe line is curved or branched, the heat-insulating unit in compliance with such geometric figure can easily be manufactured by molding or the like shaping method.

Figure 2:
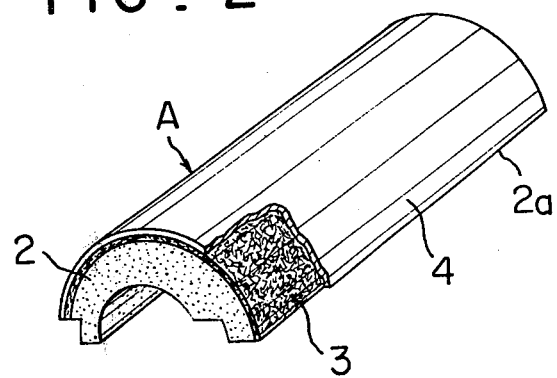
FIG. 2 is a perspective view of a semi-cylindrical heat insulating unit of the heat insulator shown in FIG. 1, the unit being partially broken to show the elastic sheet interposed between the heat-insulating panel element and the thin metal plate.

In FIG. 2 showing the structure of a preferable example of the heat-insulating unit A, a heat-insulating panel element 2 in a semi-cylindrical shape (exactly, a sectorial figure in cross section) made of a foamed synthetic resin is overlaid with an elastic sheet 3 which is further overlaid with a thin metal plate 4.

As seen in FIG. 1, a pair of the semi-cylindrical heat-insulating units (A-1 and A'-1) constituting a hollow cylindrical form as a minimum construction unit for the insulator is then combined with another pair of the units A-2 and A'-2, and other plural pairs of the units are arranged in series on the periphery of the pipe 1 whereby the individual units are combined with the adjacent ones at their longitudinal joint surfaces 2a and their semicylindrical transverse joint surface 2b. The insulator composed of a plurality of the heat-insulating units is fixed to the pipe at several points by a fixing means B for securing the cylindrical insulating units, e.g, a pair of the facing semi-cylindrical insulating units A and A'.

Examples of the foamed synthetic resin used for the heat-insulating panel element with a circular arc cross section include foams of polyisocyanate series such as a rigid polyurethane foam and polyisocyanurate foam, and cold-resisting foams such as an epoxy resin foam, a phenol resin foam and polystyrene foam. These foamy substances possess excellent heat-insulating property at low temperatures.

The heat-insulating panel element 2 can easily be obtained by any of the techniques known per se in the field of polymer industry, e.g. according to a method wherein a block of a foamed resin such as a rigid polyurethane foam is properly cut into a desired shape, a method wherein a liquid foamable synthetic resin is charged into a mold of the desired shape and foamed in the mold and thereafter the molded article is released from the mold, and a method wherein a liquid foamable synthetic resin is sprayed over the surface of a rotating core and allowed to foam to make a foamed resin layer of a predetermined thickness, and then the long hollow cylindrical foamed resin thus obtained is removed from the core and lengthwise cut into at least 2 portions of a circular arc in cross section.

The heat-insulating panel element 2 may have on its inner surface a layer of a reinforcing material such as a sheet, woven or knitted fabric, non-woven fabric or a low-foamed synthetic resin (so-called "skin of the foam"). Besides, the panel element 2 may be embedded with one or more layers of such reinforcing material for enhancing mechanical strength of the heat-insulating unit A. The low-foamed synthetic resin as a reinforcing material is obtained without any further treatment when the heat-insulating unit A is manufactured in one-shot according to a molding operation. When the reinforcing material is a fabric or the like fibrous material, it can conveniently be bonded to the heat-insulating panel element 2 by the aid of a low temperature adhesive or by utilizing self-adhesiveness of the synthetic resin at the stage of its foaming and solidification. The use of one or more layers of the reinforcing material or materials can improve the mechanical strength and dimensional stability of the circular arc heat-resisting panel element 2 and permits the use of a low density foamed synthetic resin, thus serving to reduce the production cost of the heat-insulating unit A.

Illustrative of the elastic material utilizable for the elastic sheet are, for example, plastic foams or foamed rubbers with a specific gravity of approx. 0.02~0.5, e.g. a soft polyurethane foam, a semi-rigid polyurethane foam or a soft polyvinyl chloride foam. Also utilizable as the elastic sheet 3 are elastic sheets manufactured from inorganic fibers such as ceramic fibers, rock wool, glass wool, asbestos fibers or a mixture thereof by the aid of a small amount of a binder or merely by intertwining the fibers without the use of any binder. These sheets are generally known as felt, blanket, board and paper of an inorganic material. In addition, bulky woven fabrics or braids made of the above-described inorganic fibers may also be used. The elastic sheet 3 preferably has a thickness of 1~10 mm. The use of an elastic sheet made of inorganic fibers is also preferable because of its fire-resisting property. It is preferred that such fire resistant elastic sheets have a specific gravity of 0.1~0.5 g/cm$^3$ and a thickness of 5~20 mm. These sheets are bonded integrally to the thin metal plate 4 by a rubber adhesive, polyurethane adhesive or an epoxy resin adhesive.

Examples of the thin metal plate 4 include preferably an anti-corrosive iron plate such as a zinc-coated iron plate or a resin-coated iron plate, an aluminum plate and a stainless steel plate having a thickness of about 0.1~1 mm.

The heat-insulating unit A involving the elastic sheet 3 interposed between the heat-insulating panel element 2 and the thin metal plate 4 can be fabricated, for example, according to the following compression molding method: A thin metal plate 4 such as an aluminum plate to which an elastic sheet 3 such as a felt of an inorganic fibrous material has previously been fixed by the aid of an adhesive containing as a main component thereof a polyurethane, an opoxy resin, an epoxyacrylate resin, a vinyl acetate resin or a synthetic rubber, is placed in a female mold in such manner that the thin metal plate is faced to the inner surface of the female mold. A liquid foamable synthetic resin capable of exerting self-adhesiveness when foamed and solidified is then poured into the mold. A male mold is rightly set in position and, after completion of the foaming and solidification operation, a molded article is taken out from the mold. A heat-insulating unit having a desired shape can thus be obtained, including the foamed resin heat-insulating element 2 covered with the elastic sheet 3 as intermediate layer and a water- and moisture-proof thin metal plate 4 as outermost layer. In this molded product, the surface of the foamed synthetic resin, i.e. the heat-insulating panel element 2, which was brought into contact with the inner surface of the male mold forms a hard skin as seen in bread or sponge cake and functions as a layer of the reinforcing material. Alternatively, the above molding operation may be carried out while holding a reinforcing material in the form of a sheet, a woven or non-woven fabric, a braid, a net or a bulky net structure temporarily on the inner surface of the male mold whereby this reinforcing material is fixed onto the inner surface of the heat-insulating unit A in a single step by virtue of self-adhesiveness of the foamed synthetic resin. Similarly, the heat-insulating unit involving the panel element 2 embedded with one or more layers of the reinforcing material or materials can be obtained in one step by holding the layer or layers in the female mold when the liquid foamable synthetic resin is poured thereinto.

The heat insulating unit A may be fabricated according to the following alternative method: A mold-releasing agent is applied onto a tubular or rod-like core having an outer diameter corresponding to that of a pipe for transportation of a low temperature fluid. If desired, a reinforcing material of the type above mentioned is then wound around the core. While the core is being rotated, a liquid foamable synthetic resin is sprayed over the core surface covered with the mold-releasing agent alone or further with the reinforcing material by a spraying device having a mechanism for moving a spray head along a line parallel to the axis of the core at constant speed. The foamable resin thus applied is then allowed to foam, solidified and removed from the core to obtain a cylindrical foamed resin heat-insulating element. The elastic sheet 3 and the thin metal plate 4 are successively applied to and fixed on the cylindrical heat-insulating element 2 by the aid of an adhesive of the type described hereinbefore. As a matter of course, the elastic sheet 3 and the thin metal plate 4 may be integrally combined with the cylindrical heat-insulating element 2 on the core before it is removed therefrom. In this spraying method, it is possible to manufacture a cylindrical heat-insulating unit having one or more reinforcing layers on the inner surface and/or the inside thereof, for example, by first applying a foamable synthetic resin by spraying onto a coating of the mold-releasing agent around the periphery of the core or the surface of the reinforcing material wound on the periphery of the coating until the thickness of the foamable resin reaches a predetermined value, interrupting the application of the resin at this stage, allowing the applied resin to foam, winding an additional reinforcing material around the surface of the resin after its solidification, again applying the foamable resin onto the additional reinforcing material until the thickness of the applied resin reaches a predetermined value whereby the resin is permeated in the additional reinforcing material and finally allowing the secondly applied resin to foam and repeating this cycle prior to applying the elastic sheet and the thin metal plate. The hollow cylindrical heat-insulating unit thus obtained is removed from the core and then cut lengthwise into at least 2 portions, each showing a circular arc cross section and corresponding to the heat-insulating unit as shown in FIG. 2. This method is particularly suitable for obtaining the heat-insulating unit A embedded with one or more layers of the reinforcing material or materials.

In a variant of the first mentioned method, the heat insulating unit A is fabricated by shaping a bun stock of a foamed synthetic resin with excellent low temperature characteristics, e.g. a polyisocyanate-base foamed synthetic resin such as a rigid polyurethane foam or a polyisocyanurate foam, an epoxy resin foam, a phenolic resin foam, or a polystyrene foam, into a heat-insulating element 2 of a desired form and bonding thereto the elastic sheet 3 and the thin metal plate 4 by the aid of an proper adhesive. In this case, the reinforcing material may also be applied to the inner surface of the insulating element 2.

In the fabrication of the heat insulating unit A by entirely covering the surface of the foamed resin heat-insulating element 2 with the elastic sheet 3 and then with the thin metal plate 4, it is desirable that the elastic sheet 3 be completely surrounded with the heat-insulating element 2 and the thin metal plate 4. This is advantageous because entrance of any foreign matters into interstices or voids of the elastic sheet 3 during transport and handling of the heat insulating unit A can be entirely prevented.

In practice of this invention, a group of the heat insulating units A (a pair of the semicylindrical ones as shown in FIG. 1) are assembled to surround the pipe 1 and a plural number of such groups or pair of the units A are similarly arranged in series in the lengthwise direction of the pipe 1. Although a pair of the parallel, longitudinally extending side faces and a pair of the opposite, half ring side faces of the individual heat-insulating unit A can be shaped as flat, it is preferred that the longitudinal side faces 2a be stepped as shown in FIG. 2 so as to facilitate assembling the units and to improve the sealing effect between the pair of the units. More preferably, both of the longitudinal side faces 2a and the opposite side faces 2b of the unit A are stepped with a view to achieving more improved sealing effects.

Figure 3:
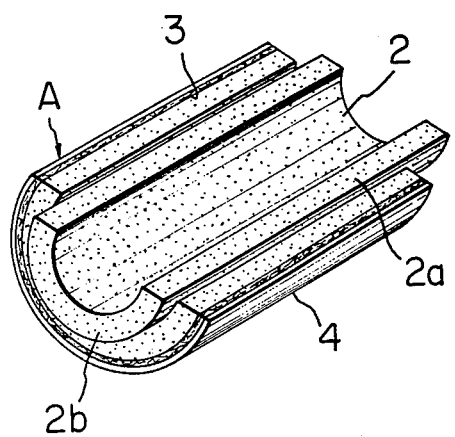
FIG. 3 is a perspective view of another example of the semi-cylindrical heat insulating unit.

In FIG. 3, the structure of the unit A is shown in which both of the faces 2a and the faces 2b are stepped. The joint portions between the adjacent heat-insulating units are sealed with a joint sealer, a foaming adhesive such as polyurethane foam-yielding prepolymer or other kinds of liquid foaming synthetic resin. These sealing agents are well known and easily commercially available. In case the temperature of the fluid to be transported through the pipe line is relatively high, each butt joint portion may be sealed with any of the above-mentioned sealing agents. On the other hand, in case the heat insulator system is used at an ultra-low temperature, each joint surface is preferably stepped to form two separate sections and the inner section (or the lower temperature section) is packed under pressure with a heat insulating material with a good compression stability while the outer section (or the higher temperature section) is packed with a moisture-proof, heat-insulating material.

Figure 4:
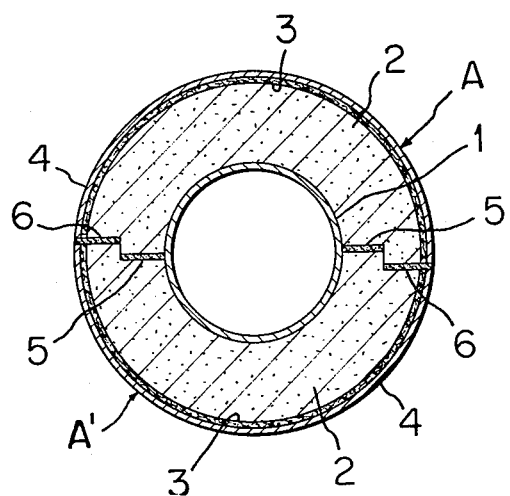
FIG. 4 is a cross-section view of the heat insulator shown in FIG. 1.

In FIG. 4 showing the cross section of the stepped joint surface of a pair of the heat-insulating units A and A', the reference numerals 1, 2, 3 and 4 have the same meanings as given above but 5 stands for a heat-insulating material having a good compression stability and 6 for a heat-insulating material possessing good moisture-proof property. Such heat-insulating sealing materials are properly selected from the conventional sealing agents, taking the operation temperature and the properties of the agents into consideration.

As the heat-insulating element is greater in shrinking ratio than the metal pipe at an extremely low temperature, the conventional heat insulator system has such a drawback that cracks or voids are apt to be formed in the joint portions of the insulator units, giving a serious adverse influence on the performance of the system. In the prior art system, a countermeasure was made to overcome such technical disadvantage by the use of a multi-layer heat-insulating unit. This multi-layer heat-insulating system was, however, disadvantageous in efficiency and economical factor.

In contrast, the heat insulating units of the present invention are sealed in the jointed portion by the above described special means, so that if the heat insulating element 2 undergoes shrinkage at an extremely low temperature in the course of transporting the super-cooled fluid, the heat-insulating material 5 with a good compression stability compressively packed in the inner section expands and absorbs stress caused by the shrinkage of the element 2, thus completely preventing the occurrence of cracks or breakages in the joint portions. Further, the moisture-proof heat-insulating material 6 packed in the outer section concurrently serves as a water- and moisture-proof material. The heat insulator of this invention can exhibit high heat-insulating effects which cannot at all be expected in the case wherein a conventional sealer is used in a usual manner.

Illustrative of the heat-insulating material 5 are, for example, glass fibers, rock wool, ceramic fibers and the like refractory fibrous materials. These materials are usually in a bulky form or may be in the form of felt or blanket. This material is desirably packed under such condition that it is compressed to 30~70% of its original volume.

The moisture-proof heat-insulating material 6 packed in the outer section of the joint portion may be non-rigid since this section is almost maintained at normal or ambient temperature. Illustrative of the moisture-proof heat-insulating material 6 are, for example, softly foamed synthetic resins of a closed cellular structure such as polyethylene foam and polyvinyl chloride foam, and foamable adhesives such as polyurethane resin or silicone resin.

Figure 5:
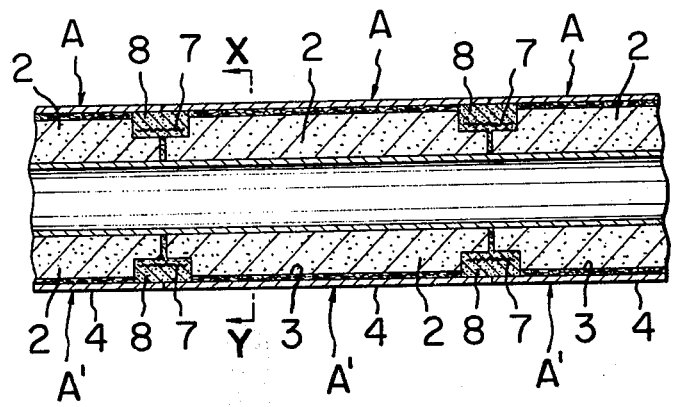
FIG. 5 is a longitudinal-section view of another embodiment of the heat insulator of this invention.
Figure 6:
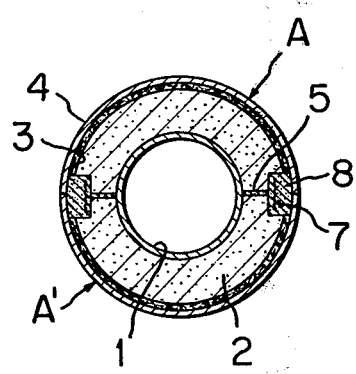
FIG. 6 is a cross-section view of the heat insulator shown in FIG. 5 cut along the line X—Y.

In FIGS. 5 and 6 showing another embodiment of the heat insulator, the heat-insulating element 2 of each heat-insulating unit is provided with a notch at each of its four outer corners so as to form a recess when the two facing units are combined. Each recess is packed with a reinforcing material 7 and then charged with a liquid foamable synthetic resin 8 which shows self-adhesiveness on foaming and solidification, e.g. a foamable semi-rigid or rigid urethane resin. The resin is foamed and solidified in the recess to make the joint portion moisture-proof and heat-insulating whereby the heat-insulating element 2, the reinforcing material 7 and the foamed synthetic resin 8 are combined integrally.

Since a liquid foamable synthetic resin is charged into the recesses of the heat-insulating element 2, foamed and then solidified, the elements are bonded strongly to each other so that the heat-insulating units can be fixed around the pipe 1 without the use of any fastening means B. The size of the recess formed in the heat-insulating element may suitably be determined taking the diameter of the transportation pipe and the temperature of the fluid into consideration. In general, the recess has a depth of 40~60% of the thickness of the insulating unit and a width of about 20~100 mm.

The side faces of the heat insulating element 2 may have the same or different shape. The side faces are not limited to those described hereinbefore but may be of any shape suitable for jointing purpose.

The reinforcing member 7 may be the same as used in the heat-insulating element 2 and may be any of the woven or non-woven fabrics, braids and net-like materials formed from glass cloth, roving cloth, chopped strand or the like fibrous materials through which the foamable liquid of the synthetic resin 8 is permeable. The exposed surfaces of the joint portions of the insulating element 2 may be left as they are or may be provided with a conventional coking material.

Figure 7:
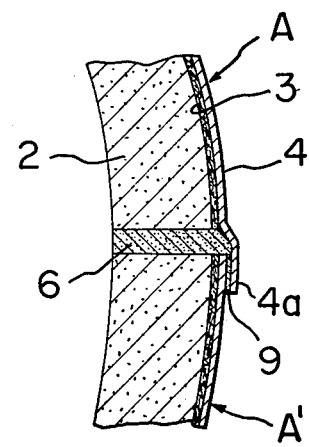
FIG. 7 is a partially enlarged cross-section view of one example of the joint portion of the heat insulating units.

In FIG. 7, the thin metal plate 4 of a heat-insulating unit A is arranged to have an extension 4a which is placed on the metal plate of the other heat-insulating unit A'. A non-curable sealer 9 such as a joint sealer may be applied into the interstice between the extension 4a and the thin metal plate to prevent any penetration of moisture.

In FIGS. 8 and 9, the thin metal plate 4 is extended at both terminal ends to have two extensions 4b which are bent toward the side face to be jointed. A coking material 10 such as a silicone or a polysulfide is packed into the space between the bent plates of the facing units A and A' to prevent any penetration of moisture.

In FIGS. 10 and 11, the thin metal plate 4 is arranged to have two outwardly bent portions 4c at its terminal ends. A joint member 11 is is slidably provided to interconnect the outwardly bent portions of the adjacent units A and A' and the space therebetween is filled with a filler 12 which is preferably moisture-resistant for improving the sealing effect of the joint portions between the heat-insulating units.

The heat insulator of this invention is distinguished by interposing the elastic sheet 3 between the heat-insulating element 2 and the thin metal plate 4 whereby stress caused by shrinkage of the panel member at a low temperature is absorbed in the elastic sheet to prevent any delamination of the thin metal plate. In addition, the use of a specific sealing means entirely prevents entrance of any foreign matter, especially moisture into the heat insulator, thus making it possible to use the insulator for a prolonged period of time without damages. These technical merits of the present invention are indeed remarkable and not expected from the conventional arts.

The forms of the invention herein shown and described in detail are to be considered only as illustrative. It will be apparent to those skilled in the art that numerous modifications may be made therein without departure from the spirit of the invention or the scope of the appended claims.

What is claimed is:

1. A heat insulator for pipe lines with an outer periphery and used for transporting low-temperature fluids, said insulator comprising in combination:
    a plurality of longitudinally divided hollow heat-insulating units assembled to tightly cover the outer periphery of said pipe lines, each heat-insulating unit including:
        a heat-insulating panel element made of a rigid foamed synthetic resin with an outer periphery and having a shape of circular cross section to fit the outer periphery of said pipe lines:
        a stress-absorbing sheet overlaid on the outer periphery of the rigid foamed synthetic resin and integrally combined with the foamed synthetic resin of said heat-insulating panel element and being capable of absorbing stress caused by shrinkage of said heat-insulating panel element at low temperature to prevent any dimensional difference therewith;
        an outermost thin metal plate placed on the outer surface of said stress-absorbing sheet and integrally combined therewith to prevent any dimensional difference between the integrally combined sheet and the outermost thin metal plate against external compression caused by supercooled fluid passing through the pipe lines; and
    means for holding together adjacent heat-insulating units combining two kinds of heat-insulating materials for higher and lower temperatures as joint sealer.

2. A heat insulator in combination according to claim 1, which includes a plurality of heat-insulating units and sealing means applied to the longitudinal and transverse joint contact surfaces of adjacent heat-insulating units.

3. A heat insulator in combination according to claim 1, wherein said longitudinally divided hollow heat-insulating unit includes a semi-cylindrical heat-insulating unit of a sector in the cross section transverse to the central longitudinal axis thereof.

4. A heat insulator in combination according to claim 1, wherein said heat-insulating panel element presents in cross section a circular arc.

5. A heat insulator in combination according to claim 1, wherein said heat-insulating panel element is made of a foamed synthetic resin having predetermined low temperature characteristics and selected from the group consisting of rigid polyurethane foam, polyisocyanurate foam, phenolic resin foam, epoxy resin foam and polystyrene foam.

6. A heat insulator in combination according to claim 1, wherein said heat-insulating panel element is cut into a selected form a foamed synthetic resin bun-like stock which has been manufactured previously.

7. A heat insulator in combination according to claim 1, wherein said heat-insulating unit is provided on its inner surface with a layer of reinforcing material.

8. A heat insulator in combination according to claim 1, wherein said heat-insulating panel element is embedded with at least one layer of a reinforcing material in a selected position in the direction of thickness.

9. A heat insulator in combination according to claim 1, wherein said sheet is made of at least one soft synthetic resin foam selected from the group consisting of polyurethane foam, polyvinyl chloride foam, and rubber foam.

10. A heat insulator in combination according to claim 1, wherein said sheet is a sheet selected from the group consisting of felt, blanket, board, paper, bulky fabric, and braid, said sheet being made by intertwining of fibers of an inorganic material selected from the group consisting of ceramics, rock wool, glass, asbestos and mixtures thereof.

11. A heat insulator in combination according to claim 10, wherein said sheet includes an effective amount of a binder.

12. A heat insulator in combination according to claim 1, wherein said thin metal plate is a plate selected from the group consisting of anti-corrosive zinc-coated steel plate, anti-corrosive resin-coated steel plate, aluminum plate, and stainless steel plate.

13. A heat insulator in combination according to claim 1, wherein said sheet is fixed to said thin metal plate by means of an adhesive including as main component a material selected from the group consisting of polyurethane resin, epoxy resin, epoxy acrylate resin, vinyl acetate resin, and synthetic rubber.

14. A heat insulator in combination according to claim 13, wherein said sheet is fixed to said thin metal plate by an elastic foamable urethane adhesive.

15. A heat insulator in combination according to claim 1, wherein said heat-insulating panel element and said sheet are combinable due to self-adhesiveness of said foamable synthetic resin on its curing for foaming.

16. A heat insulator in combination according to claim 1, wherein said heat-insulating panel element and said sheet are combinable by means of an adhesive selected from the group consisting of polyurethane resins, epoxy resins, epoxy acrylate resins, vinyl acetate resins, and synthetic rubbers.

17. A heat insulator in combination according to claim 1, wherein each joint contact portion between said heat insulating panel elements of said units is provided, at its inner, lower temperature side with a heat-insulating material having predetermined compression stability at low temperatures and, at its outer, higher temperature side with a heat-insulating material which is resistant to moisture permeation, thereby to form a joint sealed portion.

18. A heat insulator in combination according to claim 1, wherein each heat-insulating panel element of said units has stepped portions at at least one of its side faces for the provision at each joint contact portion between the adjacent heat-insulating elements of an inner, lower temperature section and an outer higher temperature section, and further comprising:
a heat-insulating material having a predetermined compression stability applied to said inner section and a moisture-proof, heat-insulating material applied to said outer section for forming a joint sealed portion.

19. A heat insulator in combination according to claim 17, wherein said heat-insulating material is a stress-absorbing sheet selected from the group consisting of felt, blanket, board and paper which sheet is made of intertwined fibers selected from the group consisting of ceramic fibers, rock wool fibers, glass fibers, and mixtures thereof.

20. A heat insulator in combination according to claim 19, wherein said sheet includes an effective amount of a binder.

21. A heat insulator in combination according to claim 17, wherein said moisture-proof, heat-insulating material is made of a foamed synthetic resin having a closed cellular structure selected from the group consisting of polyethylene foam, PVC foam, polyurethane foam, and silicone foam.

22. A heat insulator in combination according to claim 1, wherein at least each heat-insulating panel element is provided with a notch at each transverse outer corner so as to define recesses when a pair of said units are combined, each recess being provided with a reinforcing material and a foamed synthetic resin, thereby to form a sealed joint portion.

23. A heat insulator in combination according to claim 22, wherein at least said foamed synthetic resin in said recesses exhibits self-adhesiveness on foaming and solidification, has a closed cellular structure, and is selected from the group consisting of polyurethane, polyisocyanurate, epoxy resin, and silicone RTV foams.

24. A heat insulator in combination according to claim 22, wherein said reinforcing material is capable of being permeated by a liquid foamable synthetic resin of predetermined self-adhesiveness and is selected from the group consisting of woven, non-woven fabrics, braids and net-like materials made of at least one of the group consisting of glass fibers, asbestos fibers, and metal fibers.

25. A heat insulator in combination according to claim 22, wherein each joint sealed portion is covered on the outer surface thereof with a coking material.

26. A heat insulator in combination according to claim 1, wherein the thin metal plate of each unit has an extension extending from either of its terminal ends and bent towards the side face to be jointed, and a non-curable filler is sealingly packed into the space between the abutting bent extension and thin metal plate of the adjacent unit.

27. A heat insulator in combination according to claim 1, wherein the thin metal plate of each unit has two outwardly bent portions at its terminal ends, said bent portion being slidably interconnectable with the outwardly bent portions of the adjacent units by means of a joint member and the space between the two bent portions and the joint member is sealingly charged with a filler.

28. A heat insulator in combination according to claim 9 wherein thickness of said sheet is 1~10 mm.

29. A heat insulator in combination according to claim 10 wherein thickness of said inorganic material is 5~20 mm.

* * * * *